(12) United States Patent
Penicka et al.

(10) Patent No.: US 12,048,298 B2
(45) Date of Patent: Jul. 30, 2024

(54) UNIVERSAL FISHING ROD TIP TOP AND METHOD FOR ATTACHING A TIP TOP TO A FISHING ROD

(71) Applicants: Robert Penicka, Saratoga Springs, NY (US); Scott Whitmore, Port Angeles, WA (US)

(72) Inventors: Robert Penicka, Saratoga Springs, NY (US); Scott Whitmore, Port Angeles, WA (US)

( * ) Notice: Subject to any disclaimer, the term of this patent is extended or adjusted under 35 U.S.C. 154(b) by 383 days.

(21) Appl. No.: 17/128,366

(22) Filed: Dec. 21, 2020

(65) Prior Publication Data

US 2022/0000089 A1  Jan. 6, 2022

Related U.S. Application Data

(60) Provisional application No. 63/047,301, filed on Jul. 2, 2020.

(51) Int. Cl.
*A01K 87/04* (2006.01)
*A01K 87/02* (2006.01)

(52) U.S. Cl.
CPC .............. *A01K 87/04* (2013.01); *A01K 87/02* (2013.01)

(58) Field of Classification Search
CPC .... A01K 87/04; A01K 87/008; A01K 87/009; A01K 87/00; A01K 87/005; A01K 87/02
See application file for complete search history.

(56) References Cited

U.S. PATENT DOCUMENTS

| | | | | |
|---|---|---|---|---|
| 2,502,846 A | * | 4/1950 | Hoffman | A01K 87/04 D22/143 |
| 2,992,506 A | * | 7/1961 | Garbolino | A01K 87/04 D22/143 |
| 3,062,683 A | | 11/1962 | Melvin | |
| 3,099,889 A | * | 8/1963 | Verneuil | A01K 87/04 43/24 |
| 3,171,228 A | * | 3/1965 | Cwik | A01K 87/04 43/24 |
| 4,080,748 A | * | 3/1978 | Ohmura | A01K 87/04 43/24 |
| 4,261,129 A | * | 4/1981 | Ohmura | A01K 87/04 43/25 |

(Continued)

FOREIGN PATENT DOCUMENTS

| | | | | |
|---|---|---|---|---|
| FR | 1116582 A | * | 5/1956 | |
| FR | 1184340 A | * | 7/1959 | |

(Continued)

OTHER PUBLICATIONS

Translation of KR 910002910 Y1 (Year: 1991).*

(Continued)

*Primary Examiner* — Darren W Ark
*Assistant Examiner* — Katelyn T Truong
(74) *Attorney, Agent, or Firm* — Grogan, Tuccillo & Vanderleeden LLP (57) ABSTRACT

A universal tip top for a rod blank includes a leg member defining a channel for receiving a distal end of a rod blank, a frame connected to the leg member, and a ring forming a line guide supported by the frame. The channel has a longitudinal opening configured to facilitate attachment of the universal tip top to rod blanks of different diameters.

17 Claims, 11 Drawing Sheets

(56) References Cited

U.S. PATENT DOCUMENTS

| | | | | |
|---|---|---|---|---|
| 4,697,375 A | * | 10/1987 | Mills | A01K 87/04 43/17.5 |
| 5,347,743 A | * | 9/1994 | Tokuda | A01K 87/04 43/24 |
| 5,901,492 A | * | 5/1999 | Ohmura | A01K 87/04 43/24 |
| 2004/0200124 A1 | | 10/2004 | McCoy | |

FOREIGN PATENT DOCUMENTS

| | | | | | |
|---|---|---|---|---|---|
| JP | H0728634 | B2 | * | 8/1989 | |
| JP | 2516029 | Y2 | * | 11/1996 | |
| JP | 2001161225 | A | * | 6/2001 | |
| JP | 2002095388 | A | | 4/2002 | |
| JP | 3980438 | B2 | * | 9/2007 | A01K 87/00 |
| JP | 2014030429 | A | | 2/2014 | |
| JP | 2014135913 | A | * | 7/2014 | |
| JP | 2017029074 | A | * | 2/2017 | A01K 87/04 |
| JP | 2017085916 | A | | 5/2017 | |
| JP | 2018007621 | A | * | 1/2018 | |
| JP | 2018093783 | A | * | 6/2018 | |
| JP | 2018093784 | A | * | 6/2018 | |
| JP | 2019097540 | A | * | 6/2019 | E05B 55/005 |
| KR | 910002910 | Y1 | * | 5/1991 | |
| KR | 920008273 | Y1 | * | 11/1992 | |
| KR | 20050015606 | A | * | 2/2005 | |
| KR | 1391116 | B1 | * | 4/2014 | A01K 87/04 |

OTHER PUBLICATIONS

Translation of KR 920008273 Y1 (Year: 1992).*
Translation of JP 2516029 Y2 (Year: 1996).*
Corresponding PCT International Search Report and Written Opinion dated Mar. 19, 2021.

* cited by examiner

FIG. 13

UNIVERSAL FISHING ROD TIP TOP AND METHOD FOR ATTACHING A TIP TOP TO A FISHING ROD

CROSS-REFERENCE TO RELATED APPLICATIONS

This application claims the benefit of U.S. Provisional Application Ser. No. 63/047,301, filed on Jul. 2, 2020, which is hereby incorporated reference herein in its entirety.

FIELD OF THE INVENTION

The present invention relates generally to fishing rods and, more particularly, to a universal tip top that can be attached to fishing rods having a wide range of tip diameters.

BACKGROUND OF THE INVENTION

As is known in the art, it is common to employ guide eyelets to a fishing rod for the purpose of guiding the fishing line along the length of the rod. These guide eyelets are usually provided with feet which embrace the rod and are secured thereto by thread wrapped securely about both. Fishing rods also typically include a tip top that is secured to the distal tip of the fishing rod, and which includes a terminal line guide that is in alignment with the guide eyelets along the rod blank.

Conventional tip tops have barrels or sleeves having an inside diameter closely corresponds to the outside diameter of the rod tip to which it is (or will be mounted). Such tip tops are secured to the distal tip of the rod using a glue or other adhesive. It has heretofore been necessary that the inside diameter of the tip top barrel closely matches the outside diameter of the distal tip of the rod blank to ensure a good bond between the tip top and the rod blank. Accordingly, tip tops are offered in a wide range of barrel sizes, and the correct barrel must be chosen for a given rod to ensure a reliable attachment of the tip top to the distal tip of the rod blank. As will be appreciated, properly sizing and selecting a tip top for attachment to a rod blank (during manufacture or repair/replacement) can be tedious. In addition, choosing a tiptop having a barrel size that does not precisely match the rod blank tip can result in a poor connection decreased service life.

In view of the above, there is a need for a universal tip top for a fishing rod that can be mounted to fishing rods having a wide range of tip sizes.

SUMMARY OF THE INVENTION

It is an object of the present invention to provide a universal tip top for a fishing rod.

It is another object of the present invention to provide a method for securing a tip to a fishing rod.

It is another object of the present invention to provide a fishing rod having a universal tip top that is simpler and quicker to manufacture than existing fishing rods.

These and other objects are achieved by the present invention.

According to an embodiment of the present invention, a universal tip top for a rod blank includes a leg member defining a channel for receiving a distal end of a rod blank, a frame connected to the leg member, and a ring forming a line guide supported by the frame. The channel has a longitudinal opening configured to facilitate attachment of the universal tip top to rod blanks of different diameters.

According to another embodiment of the present invention, a method for securing a tip top to a fishing rod blank includes the steps of positioning a distal end of a rod blank in a non-circular channel of a leg member of a tip top, and winding one of a thread or a wrap around the leg member and the rod blank to secure the leg member and the tip top to the distal end of the rod blank.

According to yet another embodiment of the invention, a fishing rod includes a rod blank, a plurality of line guides positioned along the rod blank, and a tip top located at a distal end of the rod blank. The tip top includes a leg member defining a channel for receiving a distal end of a rod blank, a frame connected to the leg member, and a ring forming a terminal line guide supported by the frame. The channel has a longitudinal opening configured to facilitate attachment of the universal tip top to rod blanks of different diameters.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
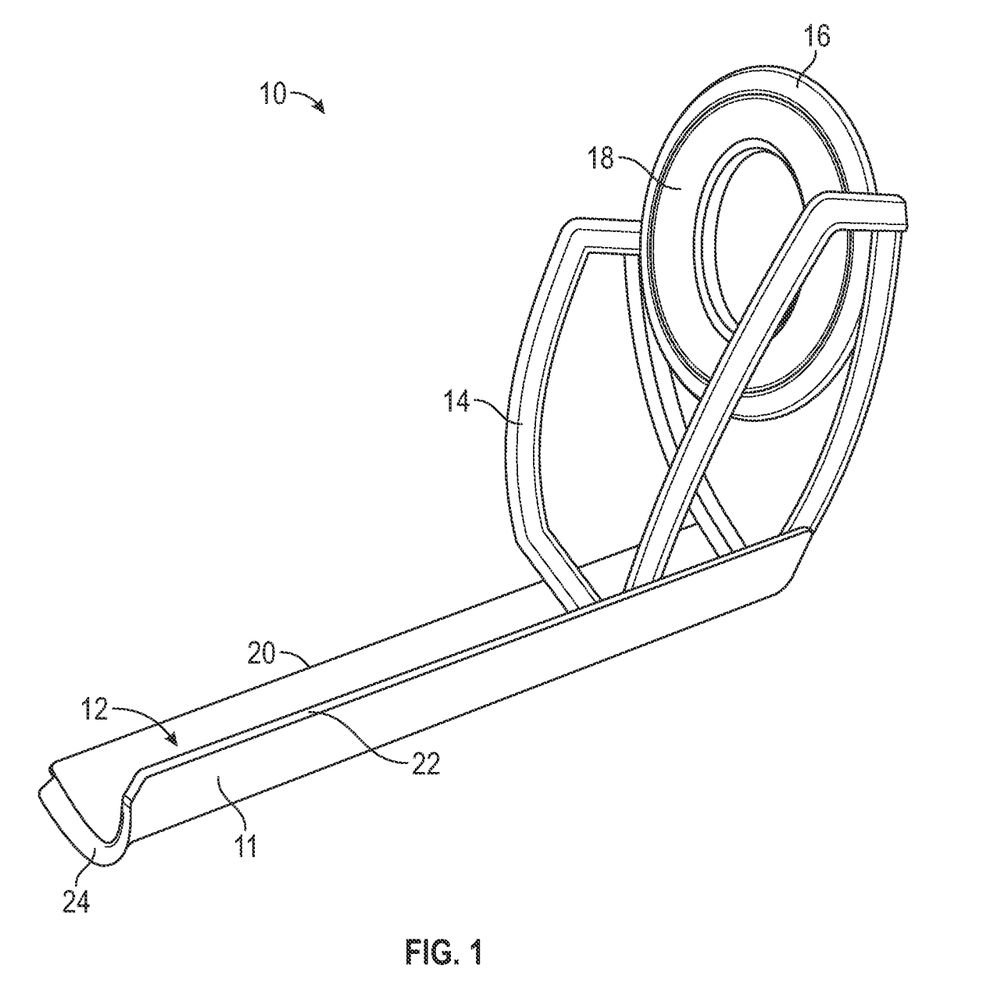
FIG. 1 is a perspective view of a universal tip top for a fishing rod, according to an embodiment of the present invention.
Figure 2:
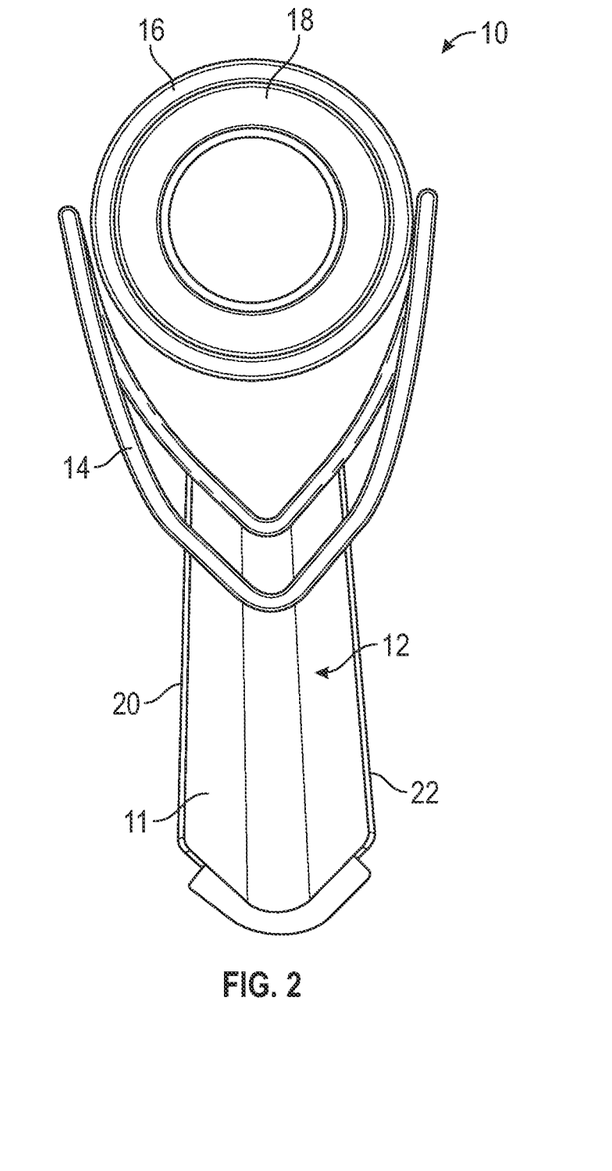
FIG. 2 is a front perspective view of the universal tip top of FIG. 1.

With reference to FIGS. 1-4, a universal tip top 10 for a fishing rod according to an embodiment of the present invention is illustrated. The universal tip top 10 includes an appendage or leg portion 11 defining a channel 12 configured to receive therein the distal end of a fishing rod blank, a frame 14 connected to the channel 12 and having a circular retention member 16 offset from the channel 12, and a ring 18 mounted within the circular retention member 16 and forming a line guide for the passage of fishing line. As best shown in FIG. 1, the channel 12 is V-shaped, having opposing longitudinal edges 20, 22 that define therebetween an opening that is configured to receive the distal end of the fishing rod blank. While FIGS. 1-4 illustrate that the channel 12 is generally V-shaped, in other embodiments, the channel 12 may be U-shaped, semi-circle in shape, or oval shape.

In connection with the above, the opposed longitudinal edges 20, 22 of the channel 12 are spaced apart by a distance sufficient to accommodate rod tips having a wide range of diameters. For example, in an embodiment, the opposed edges 20, 22 may be spaced apart by a distance of about 3/16 inches, thus allowing the universal tip top 10 to be attached to a variety of different sized rod blanks (e.g., common rod blank tip sizes ranging from 3.5 to 12 (i.e., 3.5/64ths of an inch to 12/64ths of an inch). It is contemplated, however, that the distance between the opposed edges 20, 22 may be even greater, allowing for the universal tip top 10 to be attached to rod blanks having an even wider range of tip sizes.

In an embodiment, the channel 12 is sized such that contact points of the rod blank with opposing interior sides of the channel are less than 180 degrees apart (such that the contact points between the rod blank and the channel are located at or below a cross-sectional midline of the rod blank). Accordingly, in an embodiment, the channel 12 is sized and configured such that no snap fit connection is present between the rod blank and channel 12. Depending on the size/diameter of the rod blank, a portion of the rod circumference may be proud of, or project above, an imaginary plane extending through the opposed edges 20, 22 of the channel 12. Small diameter rod blanks, however, may fit within the channel 12 so that less than 180 degrees of the rod circumference stands above such plane.

In an embodiment, the channel 12 and frame 14 may be manufactured from metal, such as steel, or plastic, and the ring 18 may be manufactured from metal, such as steel, or ceramic, although other materials known in the art may also be utilized without departing from the broader aspects of the invention.

In use, the tip top 10 may be placed at the distal end of a rod blank such that the distal end of the rod blank is received within the channel 12. The tip top 10 may then be secured to the rod blank using thread windings that are commonly used in the art to secure line guides to fishing rod blanks. In other embodiments, a wrap may be used to secure the tip top to the rod blank, as discussed hereinafter. Once the tip top is secured to the distal end of the rod blank by using a thread or guide wrap, an adhesive or water resistant coating material such as, for example, epoxy, may be used to seal and/or encase the connection (e.g., an epoxy overlay over the channel 12 and rod blank).

Importantly, the configuration of the channel 12 having a longitudinal opening, and forming contact points with the rod blank that are less than 180 degrees apart, functions as an automatic sizing mechanism. In particular, for larger diameter rod tips, the circumferential surface of the rod blank contacts the sides of the channel adjacent to the edges 20, 22 and thus sits higher in the channel 12. For smaller diameter rod tips, the circumferential surface of the rod blank contacts the sides of the channel at points spaced some greater distance from the edges 20, 22, such that the rod blank sits lower in the channel 12. In either case, the opposing sides of the channel receive the distal end of the rod blank, allowing the tip top 10 to then be secured thereto using threading or wraps, ribbon or tape. In an embodiment, as best shown in FIG. 1, the proximal end of the channel 12 may include a flange 24 that locates and retains the thread or wrap, as the case may be, on the tip top 10, and prevents it from sliding off the leg member 11.

Figure 5:
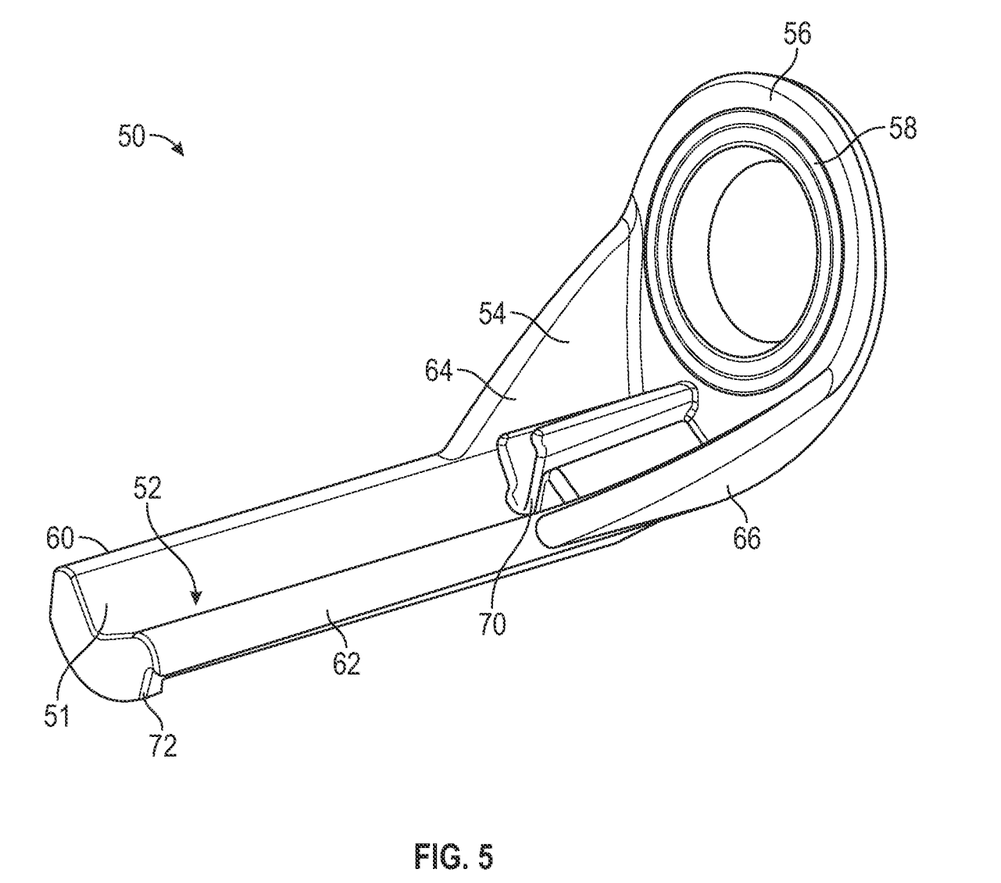
FIG. 5 is a front perspective view of a universal tip top for a fishing rod, according to another embodiment of the present invention.

Turning now to FIGS. 5-9, a universal tip top 50 according to another embodiment of the present invention is illustrated. The tip top 50 includes an appendage or leg portion 51 defining a channel 52 configured to receive therein the distal end of a fishing rod blank, a frame 54 connected to the channel 52 and having a circular retention member 56 offset from the channel 52, and a ring 58 mounted within the circular retention member 56 and forming a line guide for the passage of fishing line. As best shown in FIG. 5, the channel 12 is V-shaped, having opposing longitudinal edges 60, 62 that define therebetween an opening for receiving the distal end of the rod. blank. While FIGS. 5-9 illustrate that the channel 52 is generally V-shaped, in other embodiments, the channel 52 may be U-shaped, semi-circle in shape, or oval shape. Similar to the embodiment disclosed above, the channel 52 is sized such that contact points of the rod blank with opposing interior sides of the channel are less than 180 degrees apart (such that the contact points between the rod blank and the channel are located at or below a cross-sectional midline of the rod blank). Accordingly, in an embodiment, the channel 52 is sized and configured such that no snap fit connection is present between the rod blank and channel 52.

In an embodiment, the leg portion 51, frame 54 and retention member 56 are unitary and may be formed from, for example, plastic, although other materials known in the art may also be utilized without departing from the broader aspects of the invention. For example, in an embodiment, the leg portion 51, frame 54 and retention member 56 may be molded as a unitary component. In an embodiment, the ring 58 may be formed from steel or ceramic, although other materials known in the art may likewise be utilized. In an embodiment, the ring 58 may be co-molded into the retention member 56, which adds durability and decreases manufacturing costs. While not illustrated in FIGS. 5-9, the ring 58 may have an array of notches or projections that provide a mechanical locking means when molten plastic (or other material) is molded around it. In an embodiment, the retention member 56 is tapered, being thicker at the inner periphery where it contacts the ring 58, and thinner at the outer periphery, to allow for more plastic to surround the ring 58 while still maintaining a sleek profile, which also adds strength and reduces weight.

Similar to the tip top 10, the opposed longitudinal edges 60, 62 of the channel 52 of tip top 50 are spaced apart by a distance sufficient to accommodate rod tips having a wide range of diameters. For example, in an embodiment, the opposed edges 60, 62 may be spaced apart by a distance of about 3/16 inches, thus allowing the universal tip top 50 to be attached to a variety of different sized rod blanks (e.g., common rod blank tip sizes ranging from 3.5 to 12 (i.e., 3.5/64ths of an inch to 12/64ths of an inch). It is contemplated, however, that the distance between the opposed edges 60, 62 may be even greater, allowing for the universal tip top 50 to be attached to rod blanks having an even wider range of tip sizes.

Figure 6:
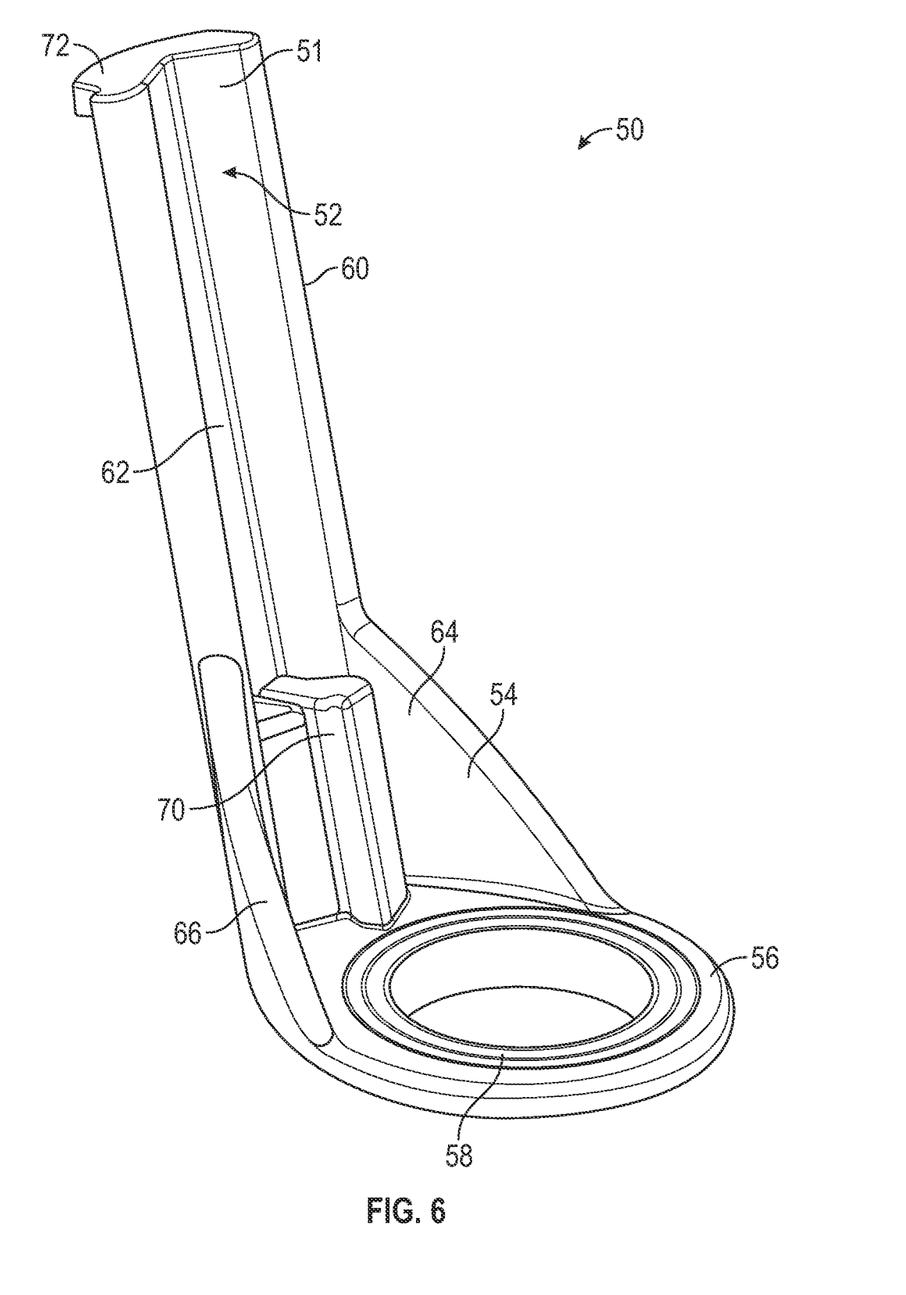
FIG. 6 is another front perspective view of the universal tip top of FIG. 5.

As best shown in FIGS. 5 and 6, and in contrast to the tip top 10, the frame 54 of the tip top 54 includes opposed wings 64, 66 having a solid construction, which provides additional strength and bolstering support for the retention member 56 and ring 58. Moreover, the solid construction of the frame 54 (as opposed to the wire frame members of the tip top 10) minimizes the possibility of line tangling by serving as bumpers or blocking members to keep the fishing line centered over, and parallel to, the rod blank. In an embodiment, the wings 64, 66 of the frame 54 are tapered such that they are thicker where they meet the leg member 52 and thinner along their respective outer edges.

Figure 7:
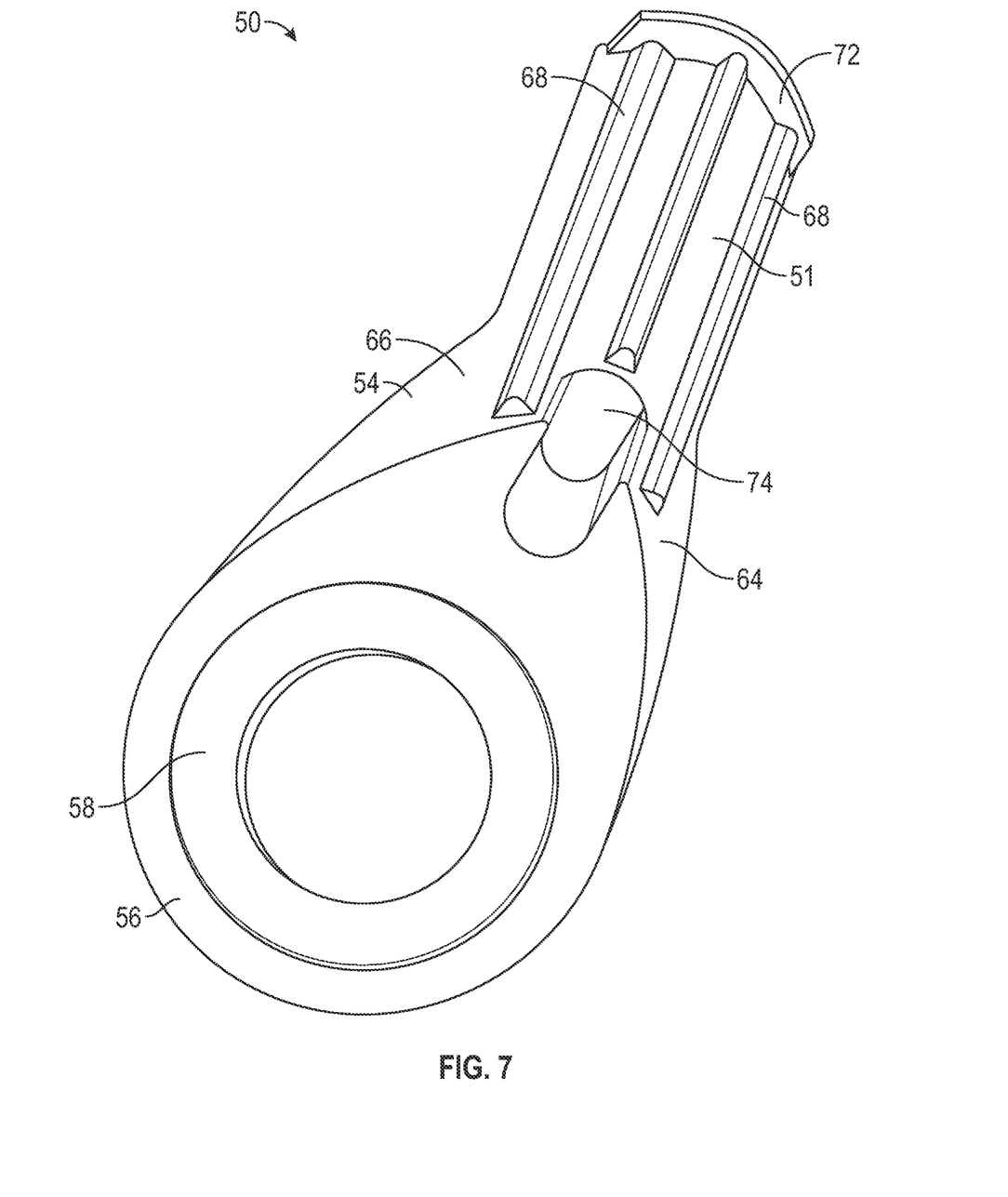
FIG. 7 is a rear perspective view of the universal tip top of FIG. 5.
Figure 8:
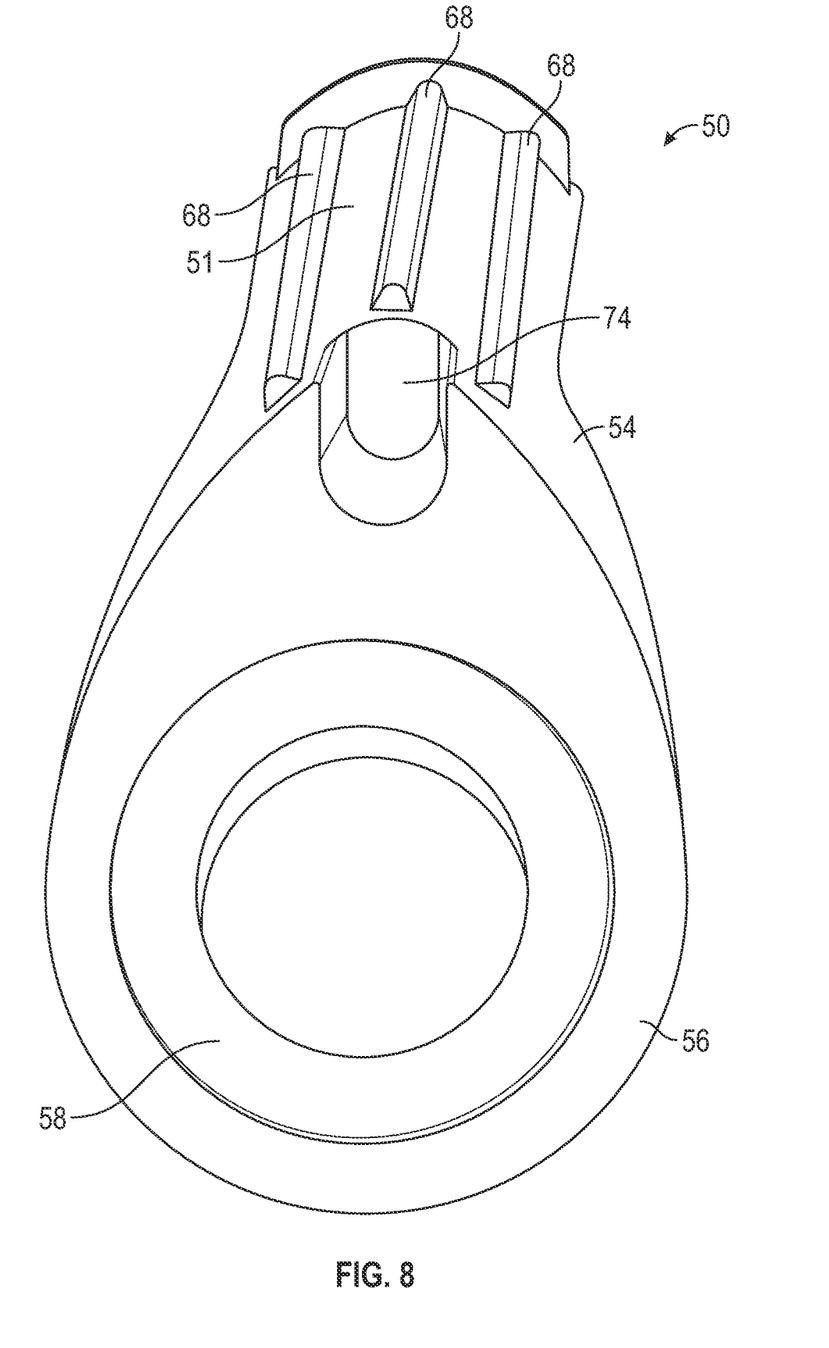
FIG. 8 is a top perspective view of the universal tip top of FIG. 5.
Figure 9:
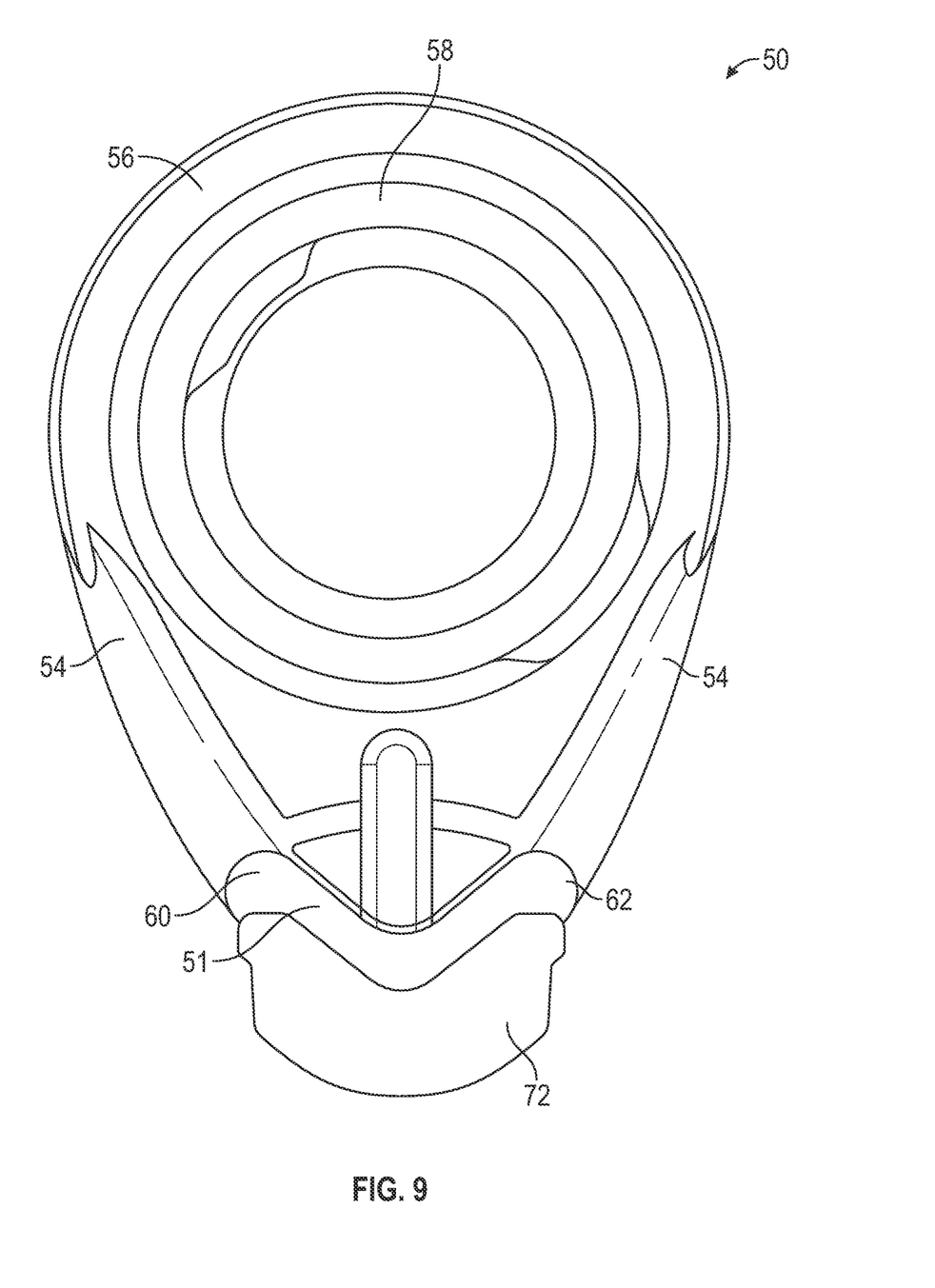
FIG. 9 is a bottom perspective view of the universal tip top of FIG. 5.

As best shown in FIGS. 7 and 8, in an embodiment, the leg member 51 includes one or more longitudinal ribs 68 on a rear face thereof (opposite channel 52). These ribs 68 help to stiffen the tip top 50, providing for a more reliable and secure interface with the rod blank. In an embodiment, the leg member 51 may also feature cutouts in the ring support area, which provide for a more uniform wall thickness which enhances moldability and yields.

With specific reference to FIGS. 5 and 6, the tip top 50 may further include a position stop 70 located within the channel 52. This stop 70 provides an interference point for the distal end of the rod blank, ensuring accurate and repeatable installation of the tip top 50 onto the distal end of the rod blank. In addition, in an embodiment, the tip top 50 includes a flange 72 at the proximal end of the leg member 51, and a projection or flange 74 at the distal end of the leg member 51 that locate and retain the thread or wrap that is utilized to secure the tip top 50 to the rod blank, as the case may be, and prevents it from sliding off the leg member 51.

Similar to the tip top 10, tip top 50 is placed at the distal end of a rod blank such that the distal end of the rod blank is received within the channel 12 (and such that the distal end of the rod blank contacts the position stop 70). The tip top 50 may then be secured to the rod blank using thread windings that are commonly used in the art to secure line guides to fishing rod blanks. In other embodiments, a wrap may be used to secure the tip top to the rod blank, as discussed hereinafter. Once the tip top is secured to the distal end of the rod blank by using a thread or guide wrap, an adhesive or water resistant coating material such as, for example, epoxy, may be used to seal and/or encase the connection (e.g., an epoxy overlay over the leg member 51 and rod blank).

Importantly, the configuration of the channel 52 and longitudinal opening thereof functions as an automatic sizing mechanism. In particular, for larger diameter rod tips, the circumferential surface of the rod blank contacts the sides of the channel adjacent to the edges 60, 62 and thus sits higher in the channel 52. For smaller diameter rod tips, the circumferential surface of the rod blank contacts the sides of the channel at points spaced some greater distance from the edges 60, 262, such that the rod blank sits lower in the channel 52. In either case, the opposing sides of the channel receive the distal end of the rod blank, allowing the tip top 50 to then be secured thereto using threading or wraps, ribbon or tape.

It is further envisioned that the tip top 50 may be part of a kit that also includes a full guide set for a rod blank. The guide sets may be manufactured using the same design features and materials that are included in the universal tip top designs disclosed above and may include for example, single and double footed designs, range of sizes from 60 mm rings down to 4 mm rings, wings (similar to wings 64, 66) to add strength and provide anti-tangling benefit, defined wrap areas on the guide foot/feet to create mechanical locking to the rod blank, and similar ring design features as described for above in connection with the tip tops.

Figure 10:
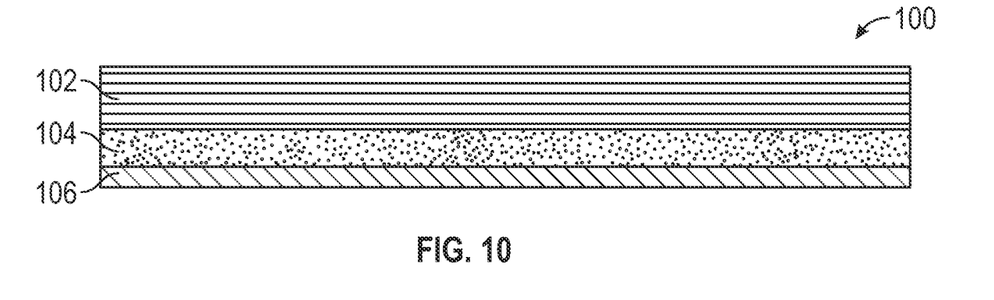
FIG. 10 is an enlarged, cross-sectional illustration of a wrap material used to attach a tip top to a fishing rod blank according to an embodiment of the present invention.
Figure 11:
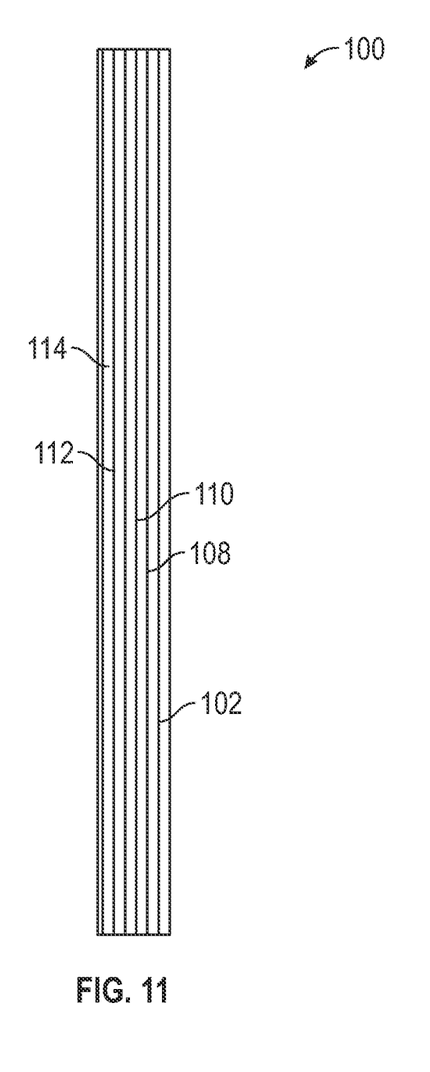
FIG. 11 is a top plan view of the wrap material of FIG. 10.

As indicated above, the universal tip tops 10, 50 may be secured to the distal end of a rod blank 150 using the customary thread and tensioning device, or via a specially configured wrap or ribbon. With reference to FIGS. 10-13 a method for securing the universal tip (e.g., tip tops 10, 50 to a fishing rod blank 150 using a wrap 100 that takes the form of a ribbon and tape will be described. As shown in FIGS. 10 and 11, in an embodiment, the wrap 100 includes a substrate 102, a pressure sensitive adhesive layer 104 affixed to one face of the substrate 102, and a backing layer or liner paper 106 removably affixed to the pressure sensitive adhesive layer 104. In an embodiment, the wrap 100 may additionally include a scrim cloth (not shown) on one side of the substrate 102.

Figure 3:
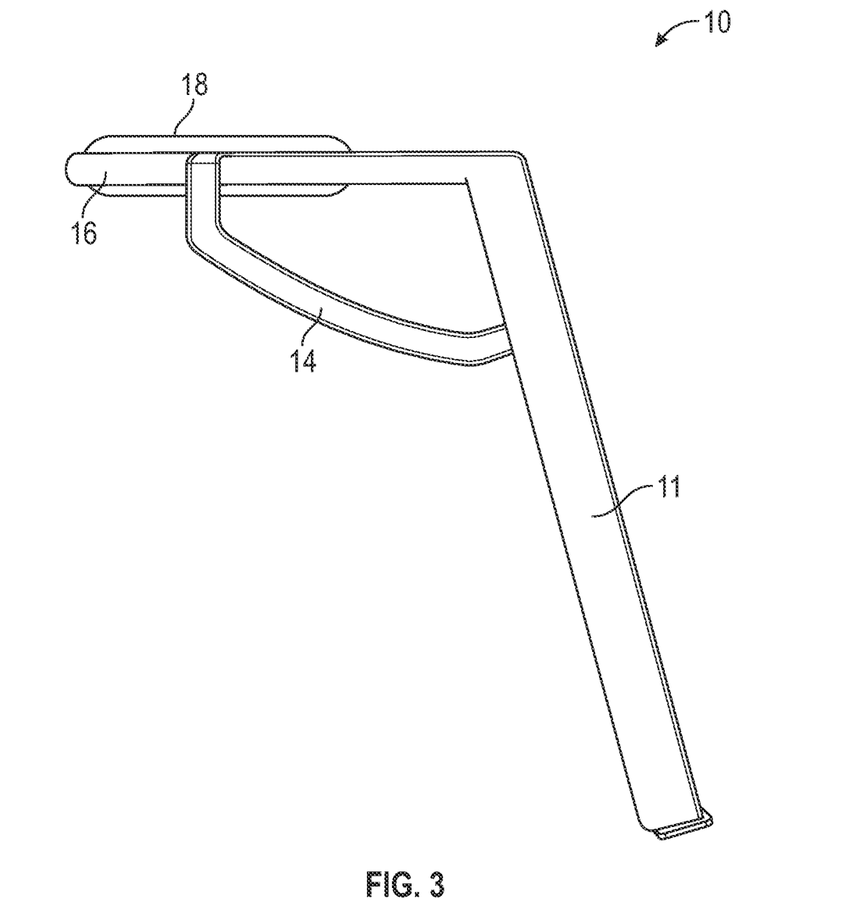
FIG. 3 is a right side elevational view of the universal tip top of FIG. 1.
Figure 4:
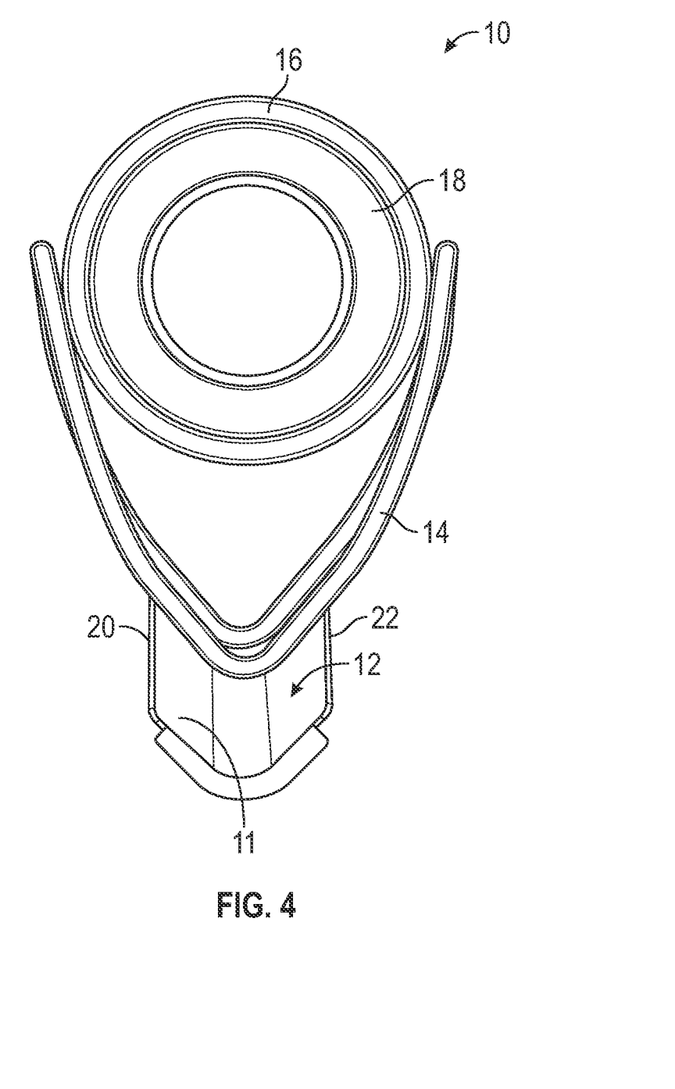
FIG. 4 is a bottom perspective view of the universal tip top of FIG. 1.

In the preferred embodiment, the substrate 102 may be a carbon fiber prepreg having a plurality of carbon fibers (preferably unidirectional carbon fibers), e.g., fibers 108, 110, 112, 114 preimpregnated with a resin, as best shown in FIG. 3. In an embodiment, the carbon fiber used has a low modulus (e.g., about 55 to about 155 GPa) and it is thinly and evenly dispersed in a prepreg sheet weighing less than about 60 grams per square meter and, more preferably, between about 20-30 grams per square meter. In an embodiment, the resin used in the carbon fiber prepreg contains no curative, obviating the need to keep the prepreg in a low temperature, low humidity environment. In addition, as the resin contains no curative, the prepreg has a long shelf life at ambient conditions, including high humidity environments, and renders it more flexible so as to facilitate the wrapping of the wrap 100 around a small diameter rod blank, as disclosed hereinafter.

While a carbon fiber prepreg is disclosed, it is contemplated, that the substrate 102 may also be formed from other materials such as, for example, fiberglass, plastic, nylon, cotton, silk, polyester, Kevlar, bamboo, and/or other flexible fiber materials, or combinations of such materials. In an embodiment, the wrap 100 is between about 1 millimeter in width to about 12 millimeters in width and, more preferably, about 3 millimeters or about ⅛ inch in width. Moreover, while the resin of the prepreg substrate is disclosed as having no curative, in some embodiments the resin may contain a curative. In yet other embodiments, the adhesive 104 may not be pressure sensitive, but instead may be formulated to adhere to the opposite side of the wrap 100 (e.g., the substrate 102) as it is would around and atop itself, in the manner disclosed hereinafter.

Figure 12:
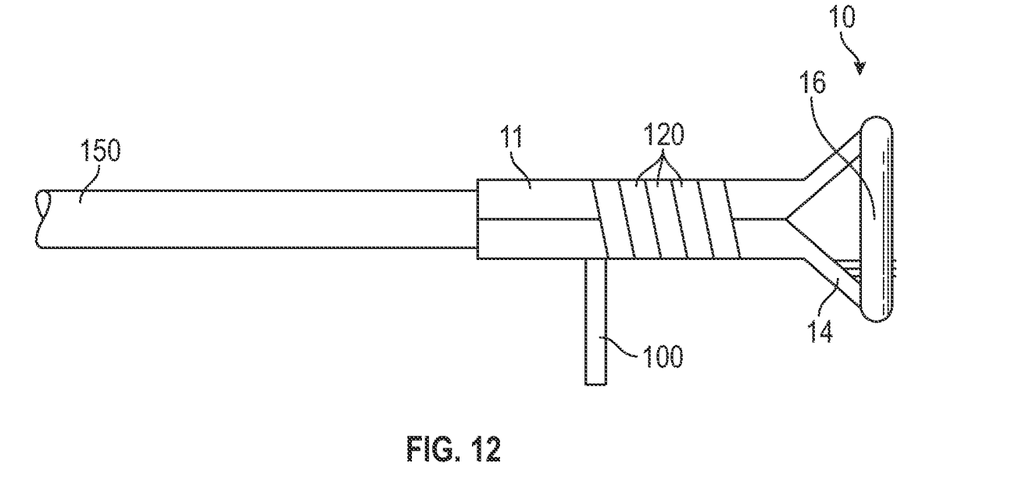
FIG. 12 is an enlarged elevational view of a fishing rod, illustrating a method for securing a universal tip top to a fishing rod blank using the wrap material of FIG. 10, according to an embodiment of the present invention.
Figure 13:
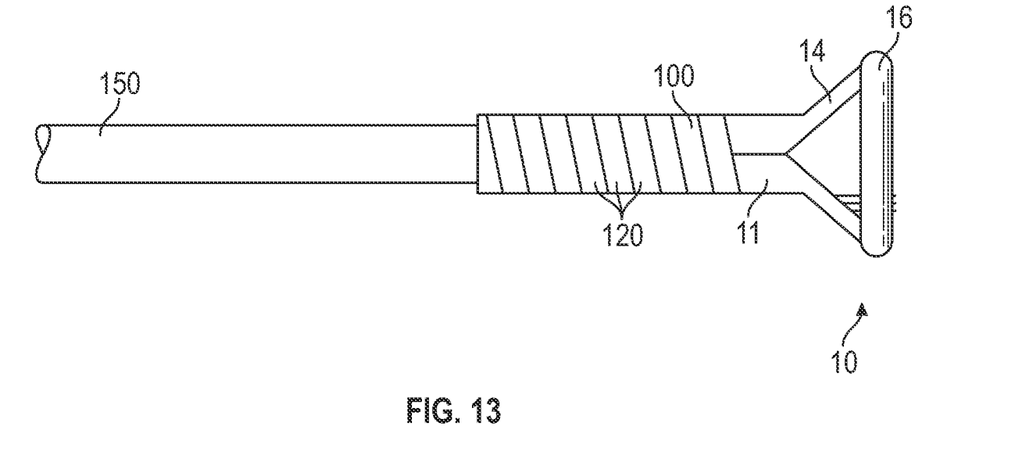
FIG. 13 is an enlarged elevational view of the fishing rod of FIG. 12, illustrating completion of the wrapping process.

With reference to FIGS. 12 and 13, in an embodiment, a method for a tip top (e.g. tip to 10) to the distal end of a rod blank 150 includes positioning a rod blank 150 in a mandrel or other device configured to rotate the rod blank 150 about its longitudinal axis. Alternatively, the rod blank 150 may simply be positioned in a holding fixture where manual rotation of the rod blank 150 will be utilized during the wrapping process. The universal tip top 10 may then be placed onto the distal ed of the rod blank 150 so that the distal end contacts the position stop of the universal tip top (where present). The backing layer 106 of the ribbon 100 is then be peeled off to expose the pressure sensitive adhesive layer 104. The wrap 100, itself, can then be used to initially secure the tip top 10 on the rod blank 150 prior to wrapping.

Once the tip top 10 is positioned in the desired position on the rod blank 150 and held in position by the wrap 100, the wrap 100 is wrapped around the distal end of the rod blank 150 and the leg member 11 of the tip top 10 in a slightly angled manner (e.g., a spiral manner) and such that the each successive turn (or wrap) 120 of the wrap 100 overlaps the preceding turn 120. In an embodiment, the overlap is approximately % the width of the wrap 100 (i.e., each successive turn overlaps approximately 50% of the preceding turn). In an embodiment, the overlap may be greater than, or less than 50%. In yet other embodiments, there may be no overlap at all, such that there are gaps present between the wrap 120. In such a case, this may be desirable to allow epoxy or overlay material, discussed below, to flow underneath the wrap material. FIG. 11 illustrates a plurality of turns 120 of the wrap 100 covering the leg member 11 and channel 12 of the guide tip top 10, part way through the wrapping process.

FIG. 13 shows the tip top 10 secured to the rod blank 150 with wrap 100, i.e., upon competition of the wrapping procedure. Once enough turns have been placed over the leg member 11 and channel 12 and rod blank 150 to secure the tip top 10 to the rod blank 150, the wrap 100 may be cut and the tail end pressed into contact with the rod blank 150 and/or one of the turns of the wrap 100 to prevent unraveling. In an embodiment, once the tip top 10 is secured using the wrap 100, an epoxy overlay (not shown) may be applied to encase the wrap 100 and leg member 11 and to protect the wrap 100 from water. As indicated above, in the case where there are spaces between adjacent turns of the wrap 100, the epoxy may flow into such spaces to more reliably secure the leg member 11 to the rod blank 150. In an embodiment, other water resistant coatings and/or materials may be utilized as an overlay or encasing material to seal and protect the wrap such as, for example, an adhesive (e.g., light cured acrylic or acrylate), without departing from the broader aspects of the invention.

In contrast to existing methods, the entire wrapping process takes only 10-15 seconds and does not require matching of tip top size barrel size to a rod blank size. This is due, at least partially, to the design of the universal tip top which allows it to be used in conjunction with rod blanks having a variety of different distal tip diameters.

While it is contemplated that the method disclosed herein is to be utilized during the fishing rod manufacturing process, it is also envisioned that the method can be readily adapted for do-it-yourself repairs (e.g., such as when a tip top breaks). Indeed, in the event a tip top requires replacement, it can be removed from the rod blank 150 and a user can secure a new tip top quite easily using the universal tip top (e.g., tip top 10 or 50), wrap 100 and method described herein. This is in contrast to current practice, where rods are often discarded or sent out to specialized shops for repair. While the embodiments disclosed above contemplate rotating the rod blank 150 to place successive turns of the wrap 100 over the blank 150 it is also envisioned that the rod blank may be held stationary while the wrap 100 is wrapped around the blank 150 in a spiral manner.

Importantly, the wrap 100 is much easier to apply that the nylon thread used in conventional methods. In addition, the carbon fibers present in the substrate 102 of the wrap 100 are much lighter and much stronger than conventional nylon thread. Moreover, in an embodiment, the thickness (depth) of the wrap 100 is between approximately $1/1000^{th}$ to about $5/10000^{th}$ of an inch thick and, more preferably, approximately $1/1000^{th}$ of an inch thick, which looks very sleek and inconspicuous once applied to the rod blank 10. In addition to the above-noted advantages, the use of the wrap 100 to secure the tip top 10 also helps increase the sensitivity of the fishing rod as compared to those using nylon threads, as the ribbon 100 and carbon fibers 108, 110, 112, 114 thereof provide less damping than nylon threads. Accordingly, in addition to ease of manufacture and decreased cost, the use of the ribbon 100 to attach the tip top also results in better performance.

In connection with the above, in a further embodiment of the present invention, a kit for the repair or manufacture of fishing rods may include a spool or length of wrap 100, a universal tip top, and one or more line guides. In an embodiment, the kit may have a plurality of different spools/lengths of wrap material, in differing widths. In an embodiment, the kit may include a plurality of line guides having different ring sizes, and/or a plurality of tip tops of different insert and frame configurations, insert sizes and/or tube sizes. The kit therefore allows for quick, easy and in-field repair/replacement of fishing rod guides and tip tops for almost any fishing rod. In particular, the kit allows a user to select among an array of wraps, guides and/or tip tops to repair almost any fishing rod.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A universal tip top for a rod blank, comprising:
a leg member having opposed longitudinal edges defining a channel therebetween for receiving a distal end of a rod blank;
a frame connected to a distal end of the leg member;
a ring forming a line guide supported by the frame;
a flange on a proximal end of the leg member, the flange extending perpendicularly from the leg member on a side of the leg member opposite the channel and away from the rod blank when the rod blank is received in the channel, the flange being configured to retain at least one of threads and/or a wrap on the leg member; and
a position stop within the channel at a distal end of the channel and extending across the channel so as to interrupt the channel, the position stop providing an interference point for contact with a distal end of the rod blank to facilitate accurate positioning of the tip top on the rod blank.

2. A universal tip top for a rod blank, comprising:
a leg member having opposed longitudinal edges defining a channel therebetween for receiving a distal end of a rod blank;
a frame having a retention member and opposed wings joining the leg member with the retention member, the opposed wings extending from different locations on the retention member to connect correspondingly to the leg member;
a ring mounted in the retention member forming a line guide supported by the frame; and
a flange on a proximal end of the leg member, the flange extending perpendicularly from the leg member on a side of the leg member opposite the channel and away from the rod blank when the rod blank is received in the channel, the flange being configured to retain at least one of threads and/or a wrap on the leg member;
wherein the channel has an opening configured to facilitate attachment of the universal tip top to rod blanks of different diameters,
wherein the channel extends transversely to the retention member,
wherein one of the opposed wings of the frame extends from the retention member to contact a location on one of the opposed longitudinal edges of the leg member and the other of the opposed wings of the frame extends from the retention member to contact a location on the other of the opposed longitudinal edges of the leg member, wherein the contact of both of the opposed wings of the frame with the opposed longitudinal edges of the leg member terminates at the edges without having any contact with the channel; and wherein the universal tip top further includes a position stop located in a distal end of the channel on a proximal side of the retention member, the position stop being configured to provide an interference point for contact with the distal end of the rod blank to facilitate accurate positioning of the tip top on the rod blank such that the distal end of the rod blank is positioned shy of the retention member and ring at a location closer to a proximal end of the channel than the retention member and ring.

3. The universal tip top of claim 2, wherein:
a distal end of the channel abuts against the retention member,
the channel is configured such that contact points of the rod blank with opposing sides of the channel are less than 180 degrees apart and at or below a midline of the rod blank.

4. The universal tip top of claim 2, wherein:
the channel is V-shaped.

5. The universal tip top of claim 2, wherein:
the channel is U-shaped.

6. The universal tip top of claim 2, wherein:
the retention member includes a circular retention member that receives the ring.

7. The universal tip top of claim 6, wherein:
the ring is formed from ceramic or steel.

8. The universal tip top of claim 2, wherein:
the frame and the leg member define a unitary molded part.

9. The universal tip top of claim 2, further comprising:
a second flange located adjacent to a distal end of the leg member on a rear face of the leg member opposite of the channel, the second flange being configured to retain the at least one of threads and/or the wrap on the leg member.

10. The universal tip top of claim 9, further comprising:
one or more ribs on the rear face of the leg member extending longitudinal between the proximal end of the leg member and the second flange.

11. A fishing rod, comprising:
a rod blank;
a plurality of line guides positioned along the rod blank; and
a tip top located at a distal end of the rod blank;
wherein the tip top includes a leg member having opposed longitudinal edges defining a channel therebetween for receiving a distal end of a rod blank, a frame having a retention member and opposed wings joining the leg member with the retention member, the opposed wings extending from different locations on the retention member to connect correspondingly to the opposed longitudinal edges of the leg member, and a ring mounted in the retention member forming a terminal line guide supported by the frame;
wherein the channel has a longitudinal opening configured to facilitate attachment of the universal tip top to rod blanks of different diameters,
wherein the channel extends transversely to the retention member,
wherein one of the opposed wings of the frame extends from the retention member to contact a location on one of the opposed longitudinal edges of the leg member and the other of the opposed wings of the frame extends from the retention member to contact a location on the other of the opposed longitudinal edges of the leg member,
wherein the contact of both of the opposed wings of the frame with the opposed longitudinal edges of the leg member terminates at the edges without having any contact with the channel;
wherein the leg member includes a flange on a proximal end of the leg member, the flange extending perpendicularly from the leg member on a side of the leg member opposite the channel, the flange being configured to retain at least one of threads and/or a wrap on the leg member; and
wherein the tip top includes a position stop within the channel at a distal end of the channel the position stop providing an interference point for contact with a distal end of the rod blank to facilitate accurate positioning of the tip top on the rod blank.

12. The fishing rod of claim 11, further comprising:
a wrap securing the tip top to the rod blank, the wrap including a substrate and an adhesive layer on at least one side of the substrate.

13. A method, comprising the steps of:
obtaining a tip top including a leg member having opposed longitudinal edges defining a channel therebetween for receiving a distal end of a fishing rod blank, a frame having a retention member and opposed wings joining the leg member with the retention member, the opposed wings extending from different locations on the retention member to connect correspondingly to the opposed longitudinal edges of the leg member, and a ring mounted in the retention member forming a terminal line guide supported by the frame,
wherein the channel extends transversely to the retention member,
wherein one of the opposed wings of the frame extends from the retention member to contact a location on one of the opposed longitudinal edges of the leg member and the other of the opposed wings of the frame extends from the retention member to contact a location on the other of the opposed longitudinal edges of the leg member,
wherein the contact of both of the opposed wings of the frame with the opposed longitudinal edges of the leg member terminates at the edges without having any contact with the channel,
positioning the distal end of the fishing rod blank in the channel of the leg member of the tip top such that the distal end of the fishing rod blank contacts a position stop extending across the channel and interrupting the channel to position the distal end of the fishing rod blank on a proximal side of the retention member and such that the distal end of the fishing rod blank is located shy of a plane defined by the retention member; and
winding one of a thread or a wrap around the leg member and the fishing rod blank to secure the leg member and the tip top to the distal end of the fishing rod blank;
wherein the leg member includes a flange on a proximal end of the leg member, the flange extending perpendicularly from the leg member on a side of the leg member opposite the channel and away from the rod blank when the rod blank is received in the channel;
wherein the flange retains the one of the thread or the wrap on the leg member.

14. The method according to claim 13, wherein:
the channel includes a longitudinal opening; and
wherein the step of positioning the distal end of the fishing rod blank in the channel of the leg member includes moving the fishing rod blank into the channel in a direction generally perpendicular to a longitudinal extent of the channel.

15. The method according to claim 14, wherein:
the wrap is used to secure the leg member and tip top to the fishing rod blank;
wherein the wrap includes a substrate having a plurality of unidirectional fibers.

16. The method according to claim 15, wherein:
the wrap includes a pressure sensitive adhesive.

17. The method according to claim 13, wherein:
the position stop is positioned in a distal end of the channel abutting against the retention member, the position stop being configured to provide an interference point for contact with the distal end of the fishing rod blank to facilitate accurate positioning of the tip top on the fishing rod blank.

\* \* \* \* \*